Jan. 19, 1971　　　WATARU ISHIBASHI　　　3,556,976
APPARATUS FOR CRACKING MATERIALS INTO GASEOUS COMPONENTS
AND ERODING SMALL BODIES INTO MICROFINE POWDER
Filed Nov. 28, 1966
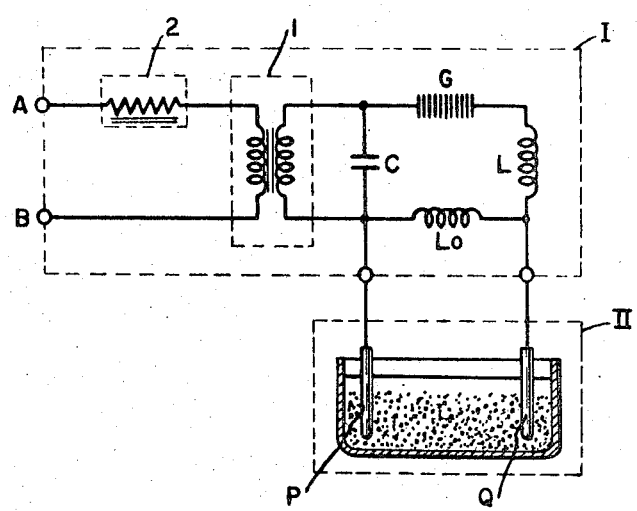
INVENTOR
Wataru Ishibashi
BY Otto John Munz
ATTORNEY 3,556,976
APPARATUS FOR CRACKING MATERIALS INTO GASEOUS COMPONENTS AND ERODING SMALL BODIES INTO MICROFINE POWDER
Wataru Ishibashi, Toyonake, Japan, assignor to Iwatani and Company Limited
Filed Nov. 28, 1966, Ser. No. 597,282
Claims priority, application Japan, Dec. 29, 1965, 40/81,539
Int. Cl. C22d 7/08
U.S. Cl. 204—327                     4 Claims

ABSTRACT OF THE DISCLOSURE

An apparatus for cracking materials into gaseous components and also eroding small metal bodies such as pellets and scraps of metal into microfine powder, comprising a source of an A.C. current; a reactor; at least one pair of electrodes within said reactor; a quenched spark gap oscillator connected to the A.C. source, having a plurality of spark gaps, and the oscillator being provided with an auxiliary coil disposed between each pair of said electrodes and connected in parallel with the output of the oscillator; a resonance coil, the inductance $L$ of which is smaller than the inductance $L_0$ of said auxiliary coil; and a capacitor the capacitance of which is not greater than $C=0.05$ $f$. and the charge-discharge voltage of which is at least 20 kv., the time constant of the discharge circuit giving at least 1200 discharges per second in the reactor.

FIELD OF THE INVENTION

This invention relates to improvements in electric discharge erosion and also cracking equipment.

More particularly, the invention relates to a quenched spark discharge gap oscillator provided with an auxiliary coil for use in conjunction with an erosion and also a cracking reactor to be employed in the production of finely divided metals or alloys, or in the cracking of various materials into their gaseous components.

Still more particularly, the invention relates to a unique combination of a reactor of the type mentioned above and a quenched spark discharge gas oscillator having an auxiliary coil.

DESCRIPTION OF THE PRIOR ART

It is known that electric discharge erosion, production of finely divided metal by electric discharge, and electric cracking of oil maye be carried out by means of electric spark discharge.

Production of metal powders, for instance, is conventionally carried out in a reactor which within itself includes a pair or pairs of electrodes and to which an electrically conductive material to be eroded is to be fed either continuously or on a batch basis.

The same applies to the cracking of oils and other materials into their gaseous components by means of electric discharge. One of such cracking techniques, elementary as it is, is described in Japanese patent publication No. 1,403/62, although arc discharge, instead of spark discharge, is employed. This technique uses carbon as electrically conductive particles and comprises inducing a multiple arc discharge in and across a thin bed of the carbon particles so as to avoid secondary reactions between carbon and cracked gas and also, to ensure that the arc discharge will not build up a high temperature. This arrangement not only entails an enormous investment in the plant but also yields only a small amount of gas per unit time. On the other hand, British Pat. No. 924,202, issued Dec. 14, 1960, discloses a cracking technique under the title of "Improvements in the relating to the production of powders of metal, alloy or other electrically conductive material." A brief examination of the relevant specification will show clearly that the technique disclosed is disadvantageous in that the cut number of the capacitor is so small that the product yield attainable is also considerably low. Furthermore, the spark discharge becomes extremely unstable as production actually starts within the reactor. To solve those disadvantages, I have previously developed a quenched spark gap oscillator with only a limited success.

Thus, even when such an oscillator is used, the spark discharge is still so erratic that only a fraction of the otherwise usable discharge energy may be utilized.

SUMMARY OF THE INVENTION

Having as its object to increase the cut number of the capacitors to be used in such a quenched spark gap oscillator and, at the same time, to stabilize the spark discharge so induced, thereby making it possible to obtain an exceptionally large discharge energy per unit time, I have developed a quenched spark gap oscillator of the construction herein illustrated and described.

Other objects and advantages of this invention will become apparent as the following description proceeds, reference being made to the accompanying drawing.

BRIEF DESCRIPTION OF THE DRAWING

The figure is an elementary wiring diagram of a quenched spark gap oscillation circuit embodying the principles of this invention.

Referring, now, to the accompanying drawing, a discharge reactor II consists in a reaction vessel which may be variously constructed insofar as it can safely hold a liquid material to be cracked, or a material to be eroded and a liquid medium in which said material is to be suspended.

Indicated by reference codes P and Q are electrodes which are immersed in said material to be cracked, or in said liquid medium. A quenched spark oscillator I consists, essentially, of a transformer 1, a limiting choke coil 2, a capacitor C, quenched spark discharge gaps G, a resonance coil L, and an auxiliary coil $L_0$.

DESCRIPTION OF THE PREFERRED EMBODIMENT

Thus, the discharge energy to be employed is the charge-discharge current of said capacitor, and in order to minimize the time constant of charge-discharge at high voltage, the discharge circuit is subjected to resonant conditions. Moreover, to ensure that the electric discharge be sufficiently stabilized, an auxiliary coil $L_0$ is disposed in parallel between each pair of the electrodes. By reducing the electrostatic capacitance C of the capacitor C as much as possible, the time constant of the capacitor C in charging becomes smaller, while a greater amount of energy may be had by raising the charging voltage thereof. The quenched spark gaps G are utilized in order to obtain the required charge-discharge cycles.

According to the results of my spark discharge erosion experiments, finely divided tungsten carbide may be produced at the rate of 0.7 kg. per hr., using a power input of about 23 kwh., while finely divided $Al_2O_3$ is produced at the rate of 10 kg. per hr., using the same equipment.

Such high rates of production have never been attained by any of the hitherto-known electric discharge techniques.

Assuming that the above-mentioned auxiliary coil $L_0$ is removed, it will be found that the discharge within the reactor becomes extremely unstable and the production rate is also lowered by about 47 percent.

In such an equipment as described above, if heavy oil, for instance, is used as a liquid phase within the reactor, a gaseous mixture of various hydrocarbons, e.g., $C_2H_2$, $C_3H_8$, etc. is formed as the oil is cracked by spark discharge.

And if aluminum pellets are placed in the above-mentioned oil, each of the pellets is wetted by said oil and a series of spark discharges is induced among the adjacent pellets. In this instance, a microfine aluminum powder is formed and, at the same time, a gaseous mixture similar to the one described above is produced. Alternatively, if the heavy oil is replaced with water, finely divided $Al_2O_3$ is produced.

According to my experiments, $C_2H_2$ was obtained at the rate of about 10 kwh./kg. of $C_2H_2$, using a power input of 23 kw./h. and a damped oscillation current frequency of about 60 kc., and at the same time, finely divided aluminum metal from 1 to 5 microns was obtained at the rate of 10 kg./hr. The average diameter of the starting aluminum pellets in the above experiment was about 3 mm.

The most important feature of the apparatus of this invention is a quenched spark gap oscillator circuit having an auxiliary coil, the construction of which is illustrated by FIG. 1.

The conditions under which said experiments were carried out are as follows:

(1) Input power—about 23 kw., 400 v.
(2) Input power factor—about 70% (lagging)
(3) High voltage transformer (a) and limiting choke coil (b)—
 (a) 400 v./30 kva., 60 c.p.s., single phase 50 kva.
 (b) 400 v., 50 kva., 100% (percent impedance volt)
(4) Input power frequency—60 c.p.s.
(5) Capacitance—$C \cong 0.05$ μf.
(6) Resonance-coil—$L \cong 170$ μh.
(7) Auxiliary coil—$L_0 \cong 2$ μh.
(8) Resonant frequency—$f \cong 60$ kc.
(9) Quenched spark gaps—
 No. of gaps=34
 Gap=0.3 mm.
(10) Cut-number—10 times per ½ c.p.s.
(11) Output voltage (60 kc.)—20 kv. (peak value)
(12) Distance between electrodes—300 mm.
(13) Size of electrode—300 mm. by 400 mm. by 10 mm.
(14) Electrode material/graphite plate
(15) Pellet size (average dia.)—3 mm.

The high-voltage transformer 1 energizes the capacitor C, the energy so accumulated being then supplied to electrodes P and Q within the discharge reactor II, which is an output load, through quenched spark gaps G and resonance coil L.

The amount of energy per charge-discharge cycle is expressed in $\frac{1}{2} C.V.^2$ (where C is capacitance and V is the peak value of charging voltage).

Therefore, when the power supply is 60 c.p.s. the power W per second is: $2 \times 60 \times n.CV^2$ watts (where C is capacitance and $n$ is cut-number).

If the above experimental data are applied, $$W = 2 \times 60 \times 10 \times 0.05 \times 10^{-6} \times (20 \times 10^3)^2 \text{ watts} = 24 \text{ kw.}$$

(where $n=10$, $C=0.05$ μf.$=0.05 \times 10^{-6}$ farad, $V=20 \times 10^3$ volts).

The measured value is 23 kw. as indicated above.

In this arrangement, by virture of the provision of said auxiliary coil $L_0$, the spark discharge gaps G create discharges in a closed circuit C–G–L–$L_0$–C, whence the terminal voltage $V_0$ of $L_0$, which is thereby induced, starts discharges within the reactor.

Discharge at the gaps takes place first and the discharge within the reactor then takes place.

The inductance of $L_0$ is previously set about 10 or more times as great as that of L and the frequency $f$ of the discharge current is:

$$f = \frac{1}{2\pi\sqrt{L.C.}} = 60 \text{ kc.}$$

Therefore, the influence of $L_0$ on frequency may be disregarded.

Stated differently, it will be understood that $L_0$ serves as a "trigger" before the spark discharge gaps G start discharging. When $L_0$ is absent as has been the case prior to this invention, there is formed a closed circuit C–G–L–Q–P–C, but in this case, the electrical state between P and Q within the reactor is the same as the electrical state at the spark discharge gaps, and can by no means be constant.

Indicated by numeral 2 is a limiting choke coil adapted to limit the short-circuit current of the transformer 1 at discharge to the rated value.

Input terminals A and B are connected to a power supply. The spark discharge gaps G have to be kept under such conditions that the spark discharges would not ionize the air, and for this purpose, they are arranged in mutually parallel relation and at spacings not exceeding about 0.3 mm.

If the ionization of the ambient air becomes vigorous, it would be difficult to stop the discharge and, as a result the charge-discharge of the capacitor C would become both irregular and smaller.

Moreover, the cut-number $n$ also comes to be smaller. It is thus apparent that quenched spark discharge is essential.

In the conventional spark discharge erosion technique, a low-voltage spark discharge is induced in the reactor, but since the voltage used is low (D.C. 200 v. or less), it is essential to employ a capacitor having some great capacitance (3,000 μf. or up), and the cut-number is extremely small (about once per second).

This cut number is equivalent to $\frac{1}{100}$ or less, as compared with the present invention. It will thus be apparent that the rate of production or processing is considerably low.

The working of the present invention will now be further described by way of an example in which the reactor is supplied with both heavy oil to be cracked and aluminum pellets having an average diameter of about 3 millimeters. Thus, as a discharge voltage through the above-mentioned quenched spark oscillator is sent through the electrodes within said reactor, the terminal voltage of said auxiliary coil $L_0$ is built up to a predetermined value ($V_0$ volts), whereupon a series of spark discharges takes place to break the oil film occuring between the adjacent pellets and corrode the surfaces of the pellets.

This corrosion carries off microfine fragments from the pellets and said fragments disperse themselves in the oil. A fresh oil film is formed between the pellets, whereby the discharge is suspended.

Now, the capacitor C starts being charged, and as a predetermined value V is reached, the terminal voltage of $L_0$ is built up to $V_0$ and, then, a spark discharge takes place a second time between P and Q. As a spark discharge is induced between the adjacent pellets, the oil is cracked, and the resulting mechanical impact agitates the pellets.

Thus, every time a spark discharge takes place, the entire suspension of pellets is stirred, whereby the pellets are prevented from fusing together and the spark discharges are allowed to take place more frequently (more than 1,200 times per second).

In the experiments described hereinbefore, the source frequency of the equipment is 60 c.p.s., and the cut-number $n=10$. However, if the source frequency is 180 c.p.s. $n$ will be about 30, and the production rate will be increased in proportion. Thus, the production rate may be further increased by using a higher source frequency.

I claim:
1. An apparatus for cracking materials into gaseous components and also eroding small metal bodies such as pellets and scraps of metal into microfine powder, comprising a source of an A.C. current; a reactor, at least one pair of electrodes within said reactor, a quenched spark gap oscillator connected to said A.C. source having a plurality of spark gaps, said oscillator being provided with:

an auxiliary coil disposed between each pair of said electrodes and connected in parallel with the output of said oscillator;

a resonance coil, the inductance $L$ of which is smaller than the inductance $L_0$ of said auxiliary coil; and a capacitor the capacitance of which is not greater than $C=0.05$ F. and the charge-discharge voltage of which is at least 20 kv., the time constant of the discharge circuit giving at least 1,200 discharges per second in said reactor.

2. An apparatus as claimed in claim 1, wherein each said spark gap is about 0.3 mm. or less and is formed by two discharge surfaces disposed in mutually parallel relation.

3. An apparatus as claimed in claim 1 for cracking materials into gaseous components, said reactor being adapted to be charged with materials to be cracked selected from a group consisting of water, oils, fats, liquid hydrocarbons, liquid argon, liquid ammonia, liquid nitrogen, and inert liquefied gases.

4. An apparatus as claimed in claim 1 for eroding small metal bodies into microfine powders, said reactor being adapted to be charged with solid electrically conductive substances.

References Cited

UNITED STATES PATENTS

| | | | |
|---|---|---|---|
| 1,106,428 | 1/1938 | Hofmann | 331—127 |
| 2,300,101 | 10/1942 | Capita | 331—127 |
| 3,220,873 | 11/1965 | Wesley | 204—171 |

FOREIGN PATENTS

| | | | |
|---|---|---|---|
| 924,202 | 12/1960 | Great Britain | 204—323 |

ROBERT K. MIHALEK, Primary Examiner.

U.S. Cl. X.R.

204—172; 219—69; 331—127.